Jan. 13, 1970  C. O'REILLY  3,489,075
LOW PRESSURE STEAM COOKER
Filed June 20, 1968

INVENTOR.
CAMPBELL O'REILLY
BY
JOHN P. CHANDLER
HIS ATTORNEY.

've# 3,489,075
LOW PRESSURE STEAM COOKER
Campbell O'Reilly, 30 W. 11th St.,
New York, N.Y. 10011
Filed June 20, 1968, Ser. No. 738,687
Int. Cl. A47j 27/04, 36/20
U.S. Cl. 99—450                                2 Claims

ABSTRACT OF THE DISCLOSURE

Utensil for steam cooking vegetables at atmospheric pressure, comprising a perforated basket provided with an imperforate annular flange to be seated on the upper edge of a cooking pot, and an imperforate, dome-shaped cover which is received on the upper end of the basket to substantially close the same.

---

This invention relates to a novel two-piece cooking utensil for the steam cooking of vegetables and other edibles to cause them to retain all their flavors and vitamins more effectively than when they are cooked in a pot of hot water.

SUMMARY OF THE INVENTION

The present invention includes a perforated basket including a generally flat bottom and a generally vertical annular side wall which leads into a horizontal annular flange of sufficient width to be received on the top of a conventional medium sized pot. It also includes a dome-shaped cover with inwardly inclined side walls leading upwardly to a central section provided with a handle.

The cover is proportioned to be received inside the top of the basket in snug fit relation or, if desired, it be of slightly larger diameter and be supported on top of the annular flange. Sufficient water for the steam cooking operation covers the lower wall of the pot and the steam passes upwardly through the perforations in the basket and the edibles therein while it contacts the inside sloping wall of the dome-shaped cover and condenser.

The principal object of the invention is to provide a steam cooker for vegetables and the like, wherein the steam is maintained at about atmospheric pressure, thus making it unnecessary to provide a pressure vessel for high pressure steam.

Some of the essential vitamins and minerals in vegetables are destroyed by the temperature of high pressure steam of conventional cookers while the low pressure steam does not impair them in any measure. Also, by utilizing low pressure steam it requires no precision fitting of parts.

Figure 1:
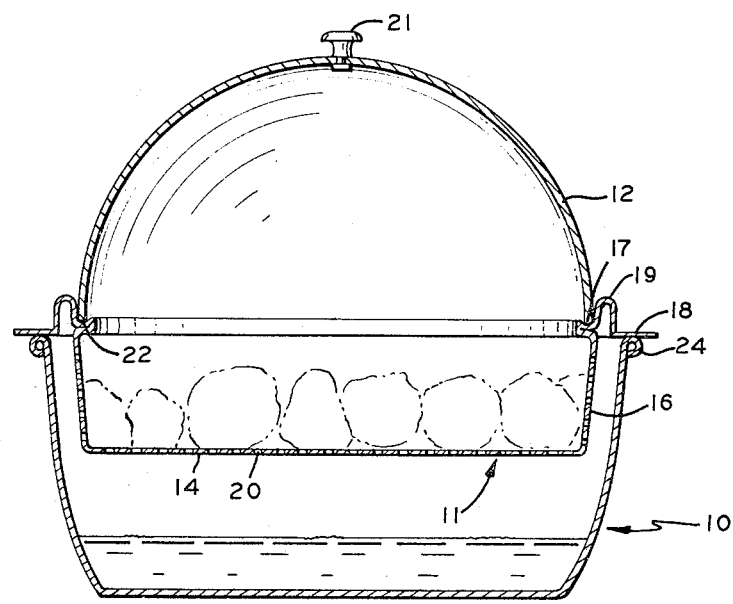
FIG. 1 is a central section taken through an embodiment of the present invention.

There is shown in FIG. 1 the two-piece steam cooking assembly which is used in conjunction with a conventional medium sized cooking pot 10. The cooker includes a basket 11 and a cover 12. The basket is preferably formed of sheet metal and has a lower wall 14 and a relatively shallow annular side wall 16 which terminates in a horizontal rim or flange 18. If desired, the portion connecting the two sections can be in the form of an inverted U-shaped section 19 and between the latter and the annular side wall 16 the metal is spun or otherwise formed inwardly to provide an annular seat 17 which is concave in cross section.

Figure 2:
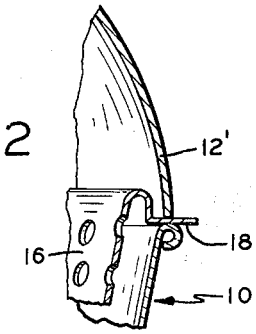
FIG. 2 is a broken section showing a modification.

The flange is wide enough to permit the use of various sizes of pots. The lower wall and the annular side wall of the basket has perforations and the size of these perforations can vary but they can be of about the size or slightly larger than the openings in a coffee percolator basket. The cover 12 can be formed in a single piece from sheet metal and the sides slope inwardly and upwardly toward the center, which latter may have a handle 21. By providing a cover with a relatively large area, a large proportion of the steam condenses and returns to the bottom of the pot. The lower edge 22 of the cover may be of such size as to fit snugly within the upper end of the side wall of the basket. While the entire cooking area is closed, the steam under moderate pressure can readily escape from the interior of the cooker since the flange 18 rests loosely on the rim 24 of the pot. There is nevertheless a large volume of available steam for the cooking operation. It was earlier pointed out that the cover 12' can be made slightly larger at the bottom and rest on the horizontal flange. This is the arrangement in FIG. 2.

What I claim is:

1. A utensil for the steam cooking of vegetables at a pressure not substantially greater than atmospheric pressure, comprising a basket formed from sheet metal and provided with a lower wall and an annular side wall and having perforations over substantially the entire area thereof, said basket being provided with an imperforate annular horizontal flange to be seated on the upper edge of a cooking pot, an inverted U-shaped annular section formed along the inner edge of said flange, and an inwardly extending annular seat, concave in cross-section, between the U-shaped section and the upper edge of said annular side wall, and an imperforate, dome-shaped cover which is received on said annular seat at the upper end of the basket to substantially close the same, the cover having inwardly inclined walls leading upwardly to the upper central section so that steam formed by heating water in the pot and contacting said walls will condense and the droplets of water so formed will flow downwardly through the side wall of the basket and into the pot while the contents of the basket will be supported above the water line.

2. The structure of claim 1 wherein the lower annular margin of the cover is so proportioned as to be received on the annular seat and inside the U-shaped annular section in snug fit relation.

References Cited

UNITED STATES PATENTS

| | | | |
|---|---|---|---|
| 965,955 | 8/1910 | Shepherd | 126—380 |
| 1,460,975 | 7/1923 | Miller et al. | 99—340 XR |
| 1,826,366 | 10/1931 | Rostek | 126—369 |
| 1,994,268 | 3/1935 | Bartels | 99—418 XR |
| 2,138,706 | 11/1938 | Myers. | |
| 2,147,319 | 2/1939 | Smith. | |

WALTER A. SCHEEL, Primary Examiner

ARTHUR O. HENDERSON, Assistant Examiner

U.S. Cl. X.R.

99—413; 126—381